US009296303B2

(12) United States Patent
Mueller et al.

(10) Patent No.: US 9,296,303 B2
(45) Date of Patent: Mar. 29, 2016

(54) ELECTRIC VEHICLE SUPPLY EQUIPMENT (EVSE) ASSEMBLY CONVERTIBLE BETWEEN A CORD SET AND A CHARGE STATION

(71) Applicant: Lear Corporation, Southfield, MI (US)

(72) Inventors: Mark Anthony Mueller, Fenton, MI (US); David A. Hein, Sterling Heights, MI (US); Mary Mueller, Fenton, MI (US); John N. Topolewski, Westland, MI (US)

(73) Assignee: Lear Corporation, Southfield, MI (US)

( * ) Notice: Subject to any disclaimer, the term of this patent is extended or adjusted under 35 U.S.C. 154(b) by 147 days.

(21) Appl. No.: 14/289,074

(22) Filed: May 28, 2014

(65) Prior Publication Data

US 2015/0054461 A1 Feb. 26, 2015

Related U.S. Application Data

(60) Provisional application No. 61/867,639, filed on Aug. 20, 2013.

(51) Int. Cl.
*H02J 7/00* (2006.01)
*B60L 11/18* (2006.01)

(52) U.S. Cl.
CPC ......... *B60L 11/1818* (2013.01); *B60L 11/1824* (2013.01); *B60L 2230/12* (2013.01); *H02J 7/0027* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ... Y02T 10/7088; Y02T 90/121; Y02T 90/14; Y02T 90/128; B60L 11/1818; B60L 2230/12; B60L 11/1824; H02J 7/0027

USPC .................................................. 320/108, 109
See application file for complete search history.

(56) References Cited

U.S. PATENT DOCUMENTS

| | | | | |
|---|---|---|---|---|
| 8,025,526 B1* | 9/2011 | Tormey | ................. | B60L 3/0069 320/109 |
| 9,013,319 B2* | 4/2015 | Pusch | ..................... | B60Q 1/50 340/636.1 |
| 9,156,367 B2* | 10/2015 | Matsuno | ............. | B60L 11/1838 |
| 2010/0207588 A1* | 8/2010 | Lowenthal | .......... | B60L 11/1816 320/165 |
| 2010/0301809 A1* | 12/2010 | Bhade | ................. | B60L 11/1824 320/148 |
| 2011/0077809 A1* | 3/2011 | Leary | .................. | B60L 11/1824 701/22 |
| 2011/0169447 A1 | 7/2011 | Brown et al. | | |
| 2011/0172839 A1 | 7/2011 | Brown et al. | | |
| 2011/0221392 A1* | 9/2011 | Gale | .................. | G01R 31/3662 320/109 |

(Continued)

*Primary Examiner* — Helen Rossoshek
(74) *Attorney, Agent, or Firm* — Brooks Kushman P.C.

(57) ABSTRACT

An EVSE assembly convertible between a charge cord and a charge station includes a charge unit having a connector of a first type, a charge station sub-assembly having a connector of a second type, and a cord set sub-assembly having a connector of the second type. The connector of the charge station sub-assembly is hard-wired to an (240V) electrical circuit. The charge unit electrically connects to the charge station sub-assembly while the connectors of the charge unit and the charge station sub-assembly are connected to one another to thereby form a (240V) charge station. The cord set sub-assembly further includes a power plug connectable to (one of a 120V and 240V) electrical outlet. The charge unit electrically connects to the cord set sub-assembly while the connectors of the charge unit and the cord set sub-assembly are connected to one another to thereby form a (120V or 240V) cord set.

18 Claims, 4 Drawing Sheets

(56) References Cited

U.S. PATENT DOCUMENTS

| | | | |
|---|---|---|---|
| 2011/0234159 A1* | 9/2011 | Ohtomo | B60L 11/1816 320/109 |
| 2012/0091961 A1* | 4/2012 | Hani | B60L 3/0069 320/109 |
| 2012/0098489 A1* | 4/2012 | Arai | B60L 3/0046 320/109 |
| 2012/0173292 A1* | 7/2012 | Solomon | G06Q 50/30 705/5 |
| 2012/0206100 A1 | 8/2012 | Brown et al. | |
| 2012/0207620 A1* | 8/2012 | Dalum | B60K 6/12 417/44.1 |
| 2012/0217928 A1* | 8/2012 | Kulidjian | B60L 3/0069 320/109 |
| 2012/0233062 A1* | 9/2012 | Cornish | B25J 11/00 705/39 |
| 2013/0015816 A1 | 1/2013 | Bianco | |
| 2013/0020991 A1* | 1/2013 | DeBoer | B60L 11/1838 320/109 |
| 2013/0046660 A1* | 2/2013 | Lowenthal | G06Q 30/04 705/30 |
| 2013/0049972 A1* | 2/2013 | Pusch | B60Q 1/50 340/636.1 |
| 2013/0088199 A1* | 4/2013 | Matsuno | B60L 11/1838 320/109 |
| 2013/0335024 A1* | 12/2013 | Akai | H01M 10/44 320/109 |
| 2014/0002024 A1* | 1/2014 | Ang | H02J 7/0036 320/109 |
| 2014/0103866 A1* | 4/2014 | Kothavale | H02J 7/0027 320/108 |
| 2015/0024632 A1* | 1/2015 | Im | B60L 3/00 439/620.01 |

* cited by examiner

ELECTRIC VEHICLE SUPPLY EQUIPMENT (EVSE) ASSEMBLY CONVERTIBLE BETWEEN A CORD SET AND A CHARGE STATION

CROSS-REFERENCE TO RELATED APPLICATIONS

This application claims the benefit of U.S. Provisional Application No. 61/867,639, filed Aug. 20, 2013, the disclosure of which is hereby incorporated in its entirety by reference herein.

TECHNICAL FIELD

The present invention relates to electric vehicle supply equipment (EVSE) cord sets and charge stations.

BACKGROUND

The phrase "electric vehicle supply equipment" (EVSE) refers to devices for delivering energy from premises wiring to an electric vehicle. One type of EVSE device is a cord set. A cord set typically includes a power cord with a power plug, an EVSE control box, a charge cord, and a charge handle sequentially connected in series. Popular types of cord sets include a 120V cord set in which the power plug is configured to be plugged into a 120V electrical outlet and a 240V cord set in which the power plug is configured to be plugged into a 240V electrical outlet. Regulations allow both of the 120V and 240V cord sets to be used indoors (e.g., either cord set may be plugged into a corresponding electrical outlet located inside a garage of a house or building). Such regulations further allow the 120V cord set to be used outdoors (e.g., the 120V cord set may be plugged into a 120V electrical outlet located on the exterior or outside of the house or building). However, such regulations do not allow the 240V cord set to be used outdoors (e.g., the 240V cord set may not be plugged into a 240V electrical outlet located on the exterior or outside of the house or building).

Another type of EVSE device is a charge station. A charge station typically includes an EVSE control box, a charge cord, and a charge handle sequentially connected in series. The charge station is a fixedly mounted EVSE device. In this regard, the control box is mounted to a wall of a house or building and is hard-wired to an electrical circuit at the mounted portion of the wall. Regulations allow a 240V charge station to be used outdoors. As such, in this case, the control box of the 240V charge station is mounted to an exterior wall of the house or building and is hard-wired to a 240V electrical circuit at the mounted portion of the exterior wall.

As described above, regulations do not allow a 240V cord set to be used outdoors (e.g., the 240V cord set is not allowed to be plugged into a 240V electrical outlet located on the exterior or outside of a house or building). On the other hand, the regulations allow a 240V charge station to be used outdoors (e.g., the 240V charge station is hard-wired to a 240V electrical outlet located on the exterior or outside of a house or building). Additionally, the regulations allow a 120V cord set to be used both outdoors and indoors.

SUMMARY

An object of the present invention is an electric vehicle supply equipment (EVSE) assembly convertible between a cord set and a charge station.

Another object of the present invention is an EVSE assembly convertible between at least one of a 120V and 240V cord set and a 240V charge station suitable for outdoor use.

A further object of the present invention is a 120V cord set convertible to 240V charge station suitable for outdoor use and convertible back into the 120V cord set.

An EVSE assembly in accordance with embodiments of the present invention includes a charge unit, a charge station sub-assembly, and at least one cord set sub-assembly. The charge unit includes an EVSE control box, a charge cord, and a charge handle connected together. The control box includes a connector plug. The connector plug of the control box is, for example, a "lockable" quick connect terminal.

The charge station sub-assembly includes a charge station housing. The charge station housing is fixedly mounted to an exterior wall of an edifice such as a garage, a house, a building, etc. The charge station housing has a receiving portion configured to physically receive and retain therein the control box when the control box is inserted into the receiving portion. The charge station housing is associated with a connector plug which is hard-wired to an electrical circuit at the mounted portion of the exterior wall. The connector plug associated with the charge station housing is also, for example, a "lockable" quick connect terminal.

The connector plug of the control box and the connector plug associated with the charge station housing are configured to connect with one another upon the control box being inserted into the receiving portion of the charge station housing. For instance, the connector plug of the control box is a male connector part and the connector plug associated with the charge station housing is a corresponding female connector part.

The control box is electrically connected to the electrical circuit while the control box is retained within the charge station housing as the connector plugs of the control box and the charge station housing connect with one another. While the control box is electrically connected to the electrical circuit, the control box makes available to the charge handle via the charge cord the electrical power from the electrical circuit. In one variation, the electrical circuit is a 240V electrical circuit. As such, while the control box is retained within the charge station housing and thereby electrically connected to the 240V electrical circuit, the assembly functions as a 240V charge station.

The control box is disconnected from the electrical circuit while the control box is removed from the charge station housing as the connector plugs of the control box and the charge station housing disconnect from one another to enable the control box to be removed from the charge station housing. In this case, the electrical power from the electrical circuit is not made available to the charge handle.

The EVSE assembly further includes a first cord set sub-assembly. The first cord set sub-assembly includes a power cord having a power plug at one end and a connector plug at another other end. The power plug is electrically pluggable into an electrical outlet. The connector plug of the power cord is the same type of connector plug as the connector plug associated with the charge station housing. As such, the connector plug of the control box is also connectable to the connector plug of the power cord. Thus, upon the control box and the power cord being connected via their corresponding connector plugs and the power cord being plugged into the electrical outlet, the control box is electrically connected to the electrical outlet and makes available to the charge handle via the charge cord the electrical power from the electrical outlet.

For instance, the first cord set sub-assembly is a 120V cord set sub-assembly. In this case, the power plug of the power cord is electrically pluggable into a 120V electrical outlet. Thus, in this case, upon the control box and the power cord being connected via their corresponding connector plugs and the power cord being plugged into the 120V electrical outlet, the EVSE assembly functions as a 120V cord set.

The EVSE assembly may further include a second cord set sub-assembly having a power cord having a power plug at one end and a connector plug at its other end. The power plug is electrically pluggable into an electrical outlet. The connector plug of the power cord is the same type of connector plug as the connector plug associated with the charge station housing. As such, the connector plug of the control box is also connectable to the connector plug of the power cord. Thus, upon the control box and the power cord being connected via their corresponding connector plugs and the power cord being plugged into the electrical outlet, the control box is electrically connected to the electrical outlet and makes available to the charge handle via the charge cord the electrical power from the electrical outlet.

For instance, the second cord set sub-assembly is a 240V cord set sub-assembly. In this case, the power plug of the power cord is electrically pluggable into a 240V electrical outlet. Thus, in this case, upon the control box and the power cord being connected via their corresponding connector plugs and the power cord being plugged into the 240V electrical outlet, the EVSE assembly functions as a 240V cord set.

In carrying out at least one of the above and other objects, the present invention provides an EVSE assembly convertible between a cord set and a charge station. The assembly includes a charge unit having a connector of a first type, a charge station sub-assembly having a connector of a second type, and a cord set sub-assembly having a connector of the second type. The charge unit electrically connects to the charge station sub-assembly while the connectors of the charge unit and the charge station sub-assembly are connected to one another to thereby form a charge station. The charge unit electrically connects to the cord set sub-assembly while the connectors of the charge unit and the cord set sub-assembly are connected to one another to thereby form a cord set.

Further, in carrying out at least one of the above and other objects, the present invention provides another EVSE assembly convertible between a cord set and a charge station. This assembly includes a charge unit having a connector of a first type, a charge station sub-assembly having a connector of a second type, the connector of the charge station sub-assembly being hard-wired to an electrical circuit, and a cord set sub-assembly having a connector of the second type and a power plug connectable to an electrical outlet. The charge unit electrically connects to the electrical circuit while the connector of the charge unit and the connector of the charge station sub-assembly are connected to one another to thereby form a charge station. The charge unit electrically connects to the electrical outlet while the power plug of the cord set sub-assembly is connected to the electrical outlet and the connectors of the charge unit and the cord set sub-assembly are connected to one another to thereby form a cord set.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
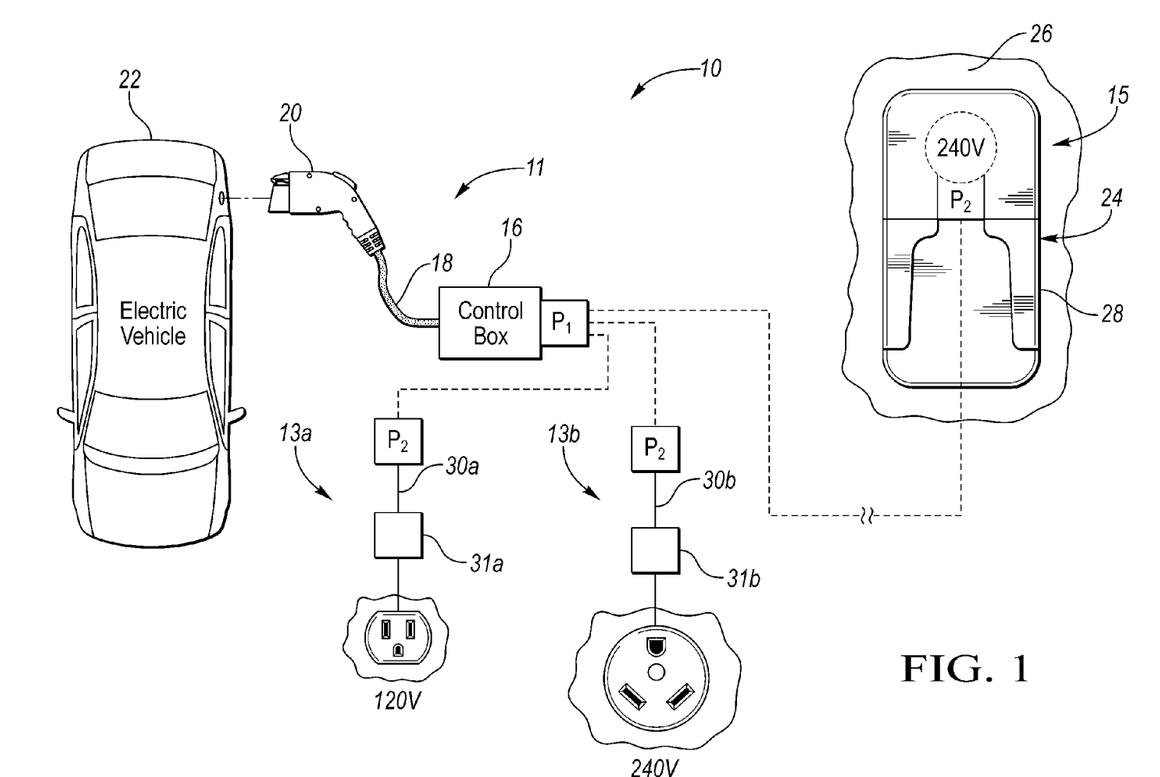
FIG. 1 illustrates a block diagram of an electric vehicle supply equipment (EVSE) assembly convertible between a cord set and a charge station in accordance with an embodiment of the present invention.

Referring now to FIG. 1, a block diagram of an electric vehicle supply equipment (EVSE) assembly 10 in accordance with an embodiment of the present invention is shown. Assembly 10 is convertible between a cord set and a charge station. In particular, assembly 10 is convertible between a charge station 14 (FIG. 2A) such as a 240V charge station, a first cord set 12a (FIG. 2B) such as a 120V cord set, and a second cord set 12b (FIG. 2C) such as a 240V cord set for in each case delivering electricity from premises wiring to an electric vehicle 22.

Figure 2A:
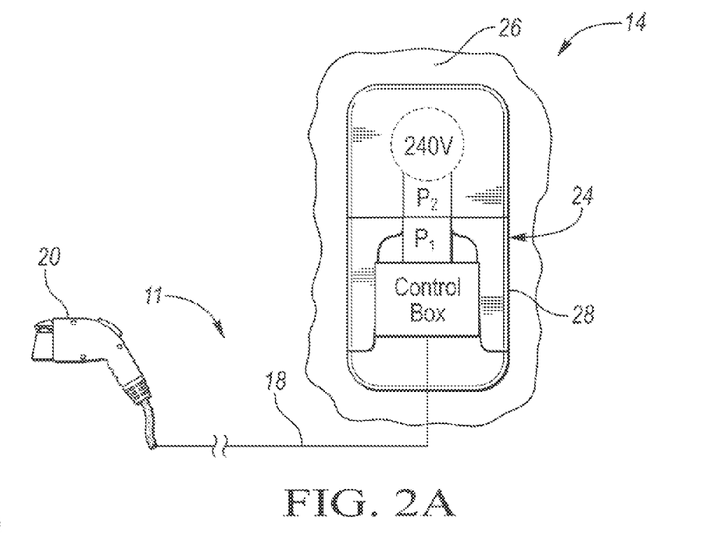
FIG. 2A illustrates a block diagram of the assembly configured as a 240V charge station.
Figure 2B:
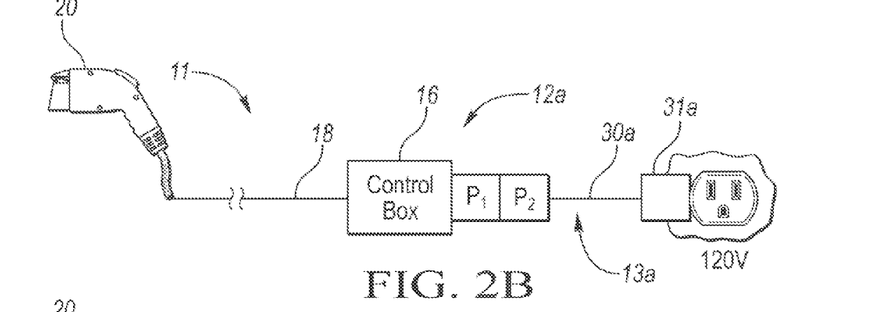
FIG. 2B illustrates a block diagram of the assembly configured as a 120V cord set.
Figure 2C:
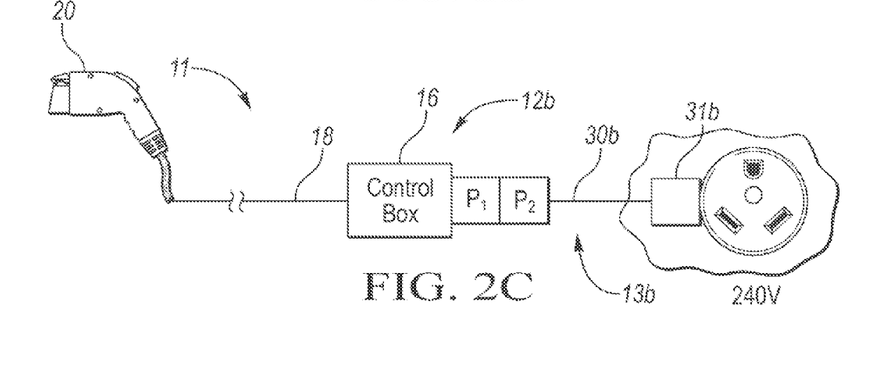
FIG. 2C illustrates a block diagram of the assembly configured as a 240V cord set.

In the case of assembly 10 being a 240V charge station 14, the assembly is for delivering 240V electrical power from a 240V electrical circuit to electric vehicle 22. In the case of assembly 10 being a 120V cord set 12a, the assembly is for delivering 120V electrical power from a 120V electrical outlet to electric vehicle 22. In the case of assembly 10 being a 240V cord set 12b, the assembly is for delivering 240V electrical power from a 240V electrical outlet to electric vehicle 22.

Assembly 10 includes a charge unit 11, a charge station sub-assembly 15, and a first cord set sub-assembly 13a. In this embodiment, assembly 10 further includes a second cord set sub-assembly 13b.

Charge unit 11 includes a control box 16 (Interconnecting Cable and Control Box (ICCB)), a charge cord 18, and a charge handle 20. Control box 16, charge cord 18, and charge handle 20 are sequentially connected in series with control box 16 being electrically connected to charge handle 20 via charge cord 18. Control box 16 includes a first connector plug P1 (i.e., a "lockable" quick connect terminal).

Charge station sub-assembly 15 includes a charge station housing 24 (e.g., a bracket). Charge station housing 24 is fixedly mounted to an exterior wall 26 of an edifice such as a garage, a house, a building, etc. Charge station housing 24 has a receiving portion 28 configured to physically receive and retain therein control box 16 when the control box is inserted into the receiving portion. Charge station housing 24 is associated with a second connector plug P2 (i.e., another "lockable" quick connect terminal). Connector plug P2 of charge station housing 24 is hard-wired to an electrical circuit, such as a 240V electrical circuit, at the mounted portion of exterior wall 26.

Connector plug P1 of control box 16 and connector plug P2 associated with charge station housing 24 are configured to connect with one another upon the control box being inserted into receiving portion 28 of the charge station housing. For instance, connector plug P1 has a male configuration and is of a given connector type and connector plug P2 has a female configuration and is of the same connector type. That is, connector plugs P1, P2 correspond with one another to be able to connect to one another and disconnect from one another.

Control box 16 is electrically connected to the 240V electrical circuit while the control box is retained within charge station housing 24 as connector plugs P1, P2 are connected with one another. While control box 16 is electrically connected to the 240V electrical circuit, the control box makes available to charge handle 20 via charge cord 18 the 240V electrical power from the 240V electrical circuit. As such, as shown in FIG. 2A, while control box 16 is retained within charge station housing 24 and thereby electrically connected to the 240V electrical circuit, assembly 10 functions as a 240V charge station 14.

Control box 16 disconnects from the 240V electrical circuit when the control box is removed from charge station housing 24 as connector plugs P1, P2 disconnect from one another to enable the control box to be removed from charge station housing 24. In this case, the 240V electrical power from the 240V electrical circuit is not made available to charge handle 20.

First cord set sub-assembly 13a includes a power cord 30a having a power plug 31a at one end and another second connector plug P2 at another end. Power plug 31a is electrically pluggable into an electrical outlet such as a 120V electrical outlet. Connector plug P2 of power cord 30a is the same type of connector plug as connector plug P2 associated with charge station housing 24. Hence, each of these two connector plugs is designated with the reference numeral "P2". Likewise, connector plug P1 of control box 16 is also connectable to connector plug P2 of power cord 30a. Thus, upon control box 16 and power cord 30a being connected via their corresponding connector plugs P1, P2 and power cord 30a being plugged into the 120V electrical outlet, the control box is electrically connected to the 120V electrical outlet and makes available to charge handle 20 via charge cord 18 the 120V electrical power from the 120V electrical outlet. As such, in this case, assembly 10 functions as a 120V cord set.

Similarly, second cord set sub-assembly 13b includes a power cord 30b having a power plug 31b at one end and another second connector plug P2 at another end. Power plug 31b is electrically pluggable into an electrical outlet such as a 240V electrical outlet. Connector plug P2 of power cord 30a is also the same type of connector plug as connector plug P2 associated with charge station housing 24. As such, connector plug P1 of control box 16 is also connectable to connector plug P2 of power cord 30b. Thus, upon control box 16 and power cord 30b being connected via their corresponding connector plugs P1, P2 and power cord 30b being plugged into the 240V electrical outlet, the control box is electrically connected to the 240V electrical outlet and makes available to charge handle 20 via charge cord 18 the 240V electrical power from the 240V electrical outlet. As such, in this case, assembly 10 functions as a 240V cord set.

Figures 3, 4:
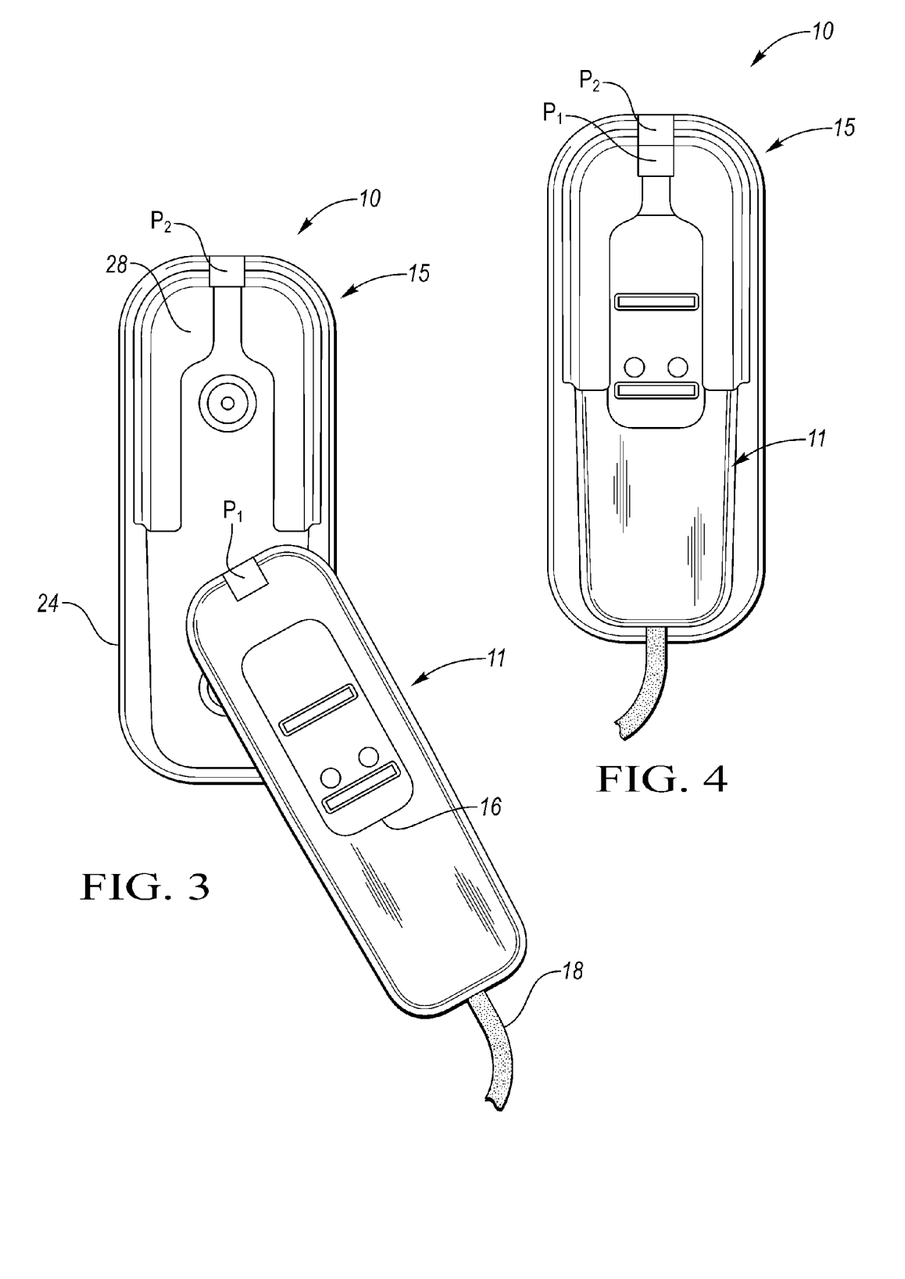
FIG. 3 illustrates a perspective view of the charge unit disconnected from the charge station sub-assembly.
FIG. 4 illustrates a perspective view of the charge unit connected to the charge station sub-assembly.

Referring now to FIG. 3, a perspective view of charge unit 11 disconnected from charge station sub-assembly 15 is shown. In this case, control box 16 of charge unit 11 is removed from receiving portion 28 of charge station housing 24. As such, connector plug P1 of control box 16 and connector plug P2 associated with charge station housing 24 are disconnected from one another.

As further shown in FIG. 3, connector plug P2 associated with charge station housing 24 is on the top side of the housing to prevent water from pooling in the connector. Further, a weatherproof cover or trap door may be employed when the connector plug P2 is not engaged.

Referring now to FIG. 4, a perspective view of charge unit 11 connected to charge station sub-assembly 15 is shown. In this case, control box 16 is retained within receiving portion 28 of charge station housing 24. As a result, connector plug P1 of control box 16 and connector plug P2 associated with charge station housing 24 are connected to one another. Consequently, control box 16 is electrically connected to the 240V electrical circuit and assembly 10 functions as a 240V charge station 14 as shown in FIG. 2A.

Figure 5:
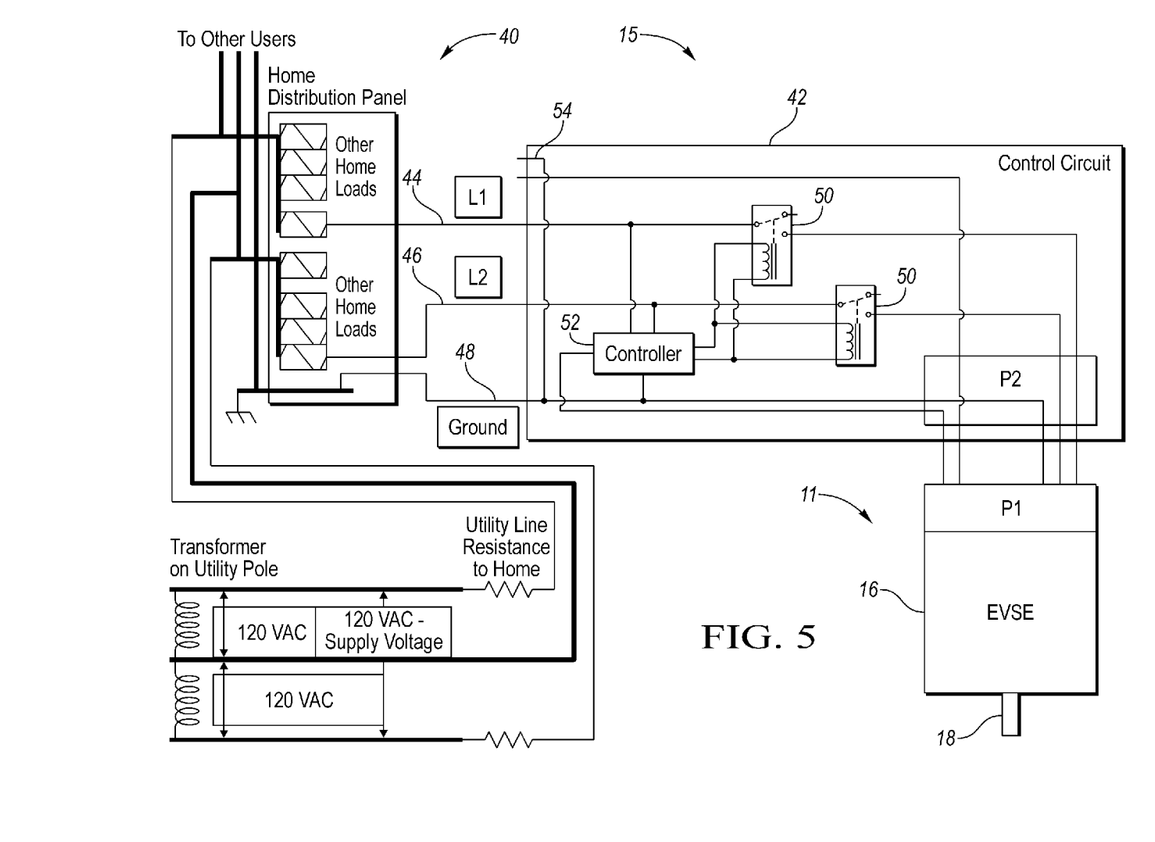
FIG. 5 illustrates a schematic depicting the hard-wired connection between the connector plug of the charge station sub-assembly and a home electrical circuit and depicting electrical circuit features of the charge station sub-assembly.

Referring now to FIG. 5, a schematic depicting the hardwired connection between the connector plug P2 of charge station sub-assembly 15 and a home electrical circuit 40 and depicting electrical circuit features of the charge station sub-assembly is shown.

As shown in FIG. 5, charge station sub-assembly 15 further includes a control circuit 42. Control circuit 42 is electrically connected between home electrical circuit 40 and connector plug P2 of charge station sub-assembly 15. Control circuit 42 is electrically connected at one end to home wiring electrical lines L1 44, L2 46, and ground 48. In general, control circuit 42 is configured to enable and disable the electrical connection between the home wiring electrical lines and connector plug P2 of charge station sub-assembly 15.

In order to prevent access to live connections, control circuit 42 automatically disconnects the AC power from the home wiring electrical lines to connector plug P2 of charge station sub-assembly 15 upon control box 16 of charge unit 11 being removed from charge station housing 24 (i.e., upon connector plug P1 of control box 16 of charge unit being disconnected from connector plug P2 of charge station sub-assembly 15). Control circuit 42 includes a set of AC relays 50 to disconnect the AC power from connector plug P2 of charge station sub-assembly 15 when charge unit 11 is removed from charge station housing 24. Control circuit 42 includes a controller 52 configured to control relays 50.

Controller 52 of control circuit 42 looks for activation from charge unit 11 before powering connector plug P2 of charge station sub-assembly 15 with the AC power for powering charge unit 11. Controller 52 takes a control signal from control box 16 of charge unit 11 to enable relays 50. Control circuit 42 may be configured to optionally power relays 50 to enable charge to charge unit 11. The control signal from control box 16 of charge unit 11 operates to enable charge to charge unit 11, even though charge unit 11 has not yet been powered. For instance, control box 16 of charge unit 11 applies a resistance to ground that is detected by control circuit 42. Optionally, control circuit 42 uses optically coupled components to activate relays 50.

An optional grid control signal 54 may be provided to control circuit 42. Grid control signal 54 is a digital control signal to either set the charge station to half power or to turn off the charge station. This feature is utilized for the interruptible power service or a smart grid controller or home network control.

The charge station may employ further or alternative optional auto power down features. For instance, charge station housing 24 may be associated with an integrated electronic switch to automatically disconnect power from connector plug P2 of charge station housing 24 when the electronic assembly is removed. The electronic assembly prevents connector plug P2 from having live voltage unless the interlock circuit is properly energized. The electronic assembly may contain a NTC for thermal protection. Connector plug P2 may be associated with an interlock mechanism configured to prevent the operation of contactors/relays. As control box 16 of charge unit 11 is removed from charge station housing 24, the interlock contacts will disconnect first and disconnect power to the control box 16 before the power terminals associated with the control box 16 disconnect.

As described, features in accordance with embodiments of the present invention include: enabling a cord set to be converted into a charge station; providing a convertible 240V EVSE charge station suitable for outdoor use which can be converted to a 120V (or 240V) cord set; allowing a 120V cord set to be converted into a movable 240V charge station suitable for outdoor use; and allowing a user to remove the product from the wall and use it as a 120V portable cord set.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric vehicle supply equipment assembly comprising:
   a charge unit having a first connector of a first type and a control box connected to the first connector;
   a charge station sub-assembly having a second connector of a second type and a charge station housing a receiving portion configured to physically receive therein the control box of the charge unit; and
   a cord set sub-assembly having a third connector of the second type;
   wherein the first connector of the charge unit and the second connector of the charge station sub-assembly directly connect to one another upon the control box of the charge unit being physically received within the receiving portion of the charge station housing, the charge unit being electrically connected to the charge station sub-assembly while the first connector of the charge unit and the second connector of the charge station sub-assembly are connected to one another to thereby form a charge station;
   wherein the charge unit electrically connects to the cord set sub-assembly while the first connector of the charge unit and the third connector of the cord set sub-assembly are connected to one another to thereby form a cord set.

2. The assembly of claim 1 further comprising:
   a second cord set sub-assembly having a fourth connector of the second type;
   wherein the charge unit electrically connects to the second cord set sub-assembly while the first connector of the charge unit and the fourth connector of the second cord set sub-assembly are connected to one another to thereby form a second cord set.

3. The assembly of a wherein:
   the second connector of the charge station sub-assembly is hard-wired to an electrical circuit, the charge unit being electrically connected to the electrical circuit while the charge unit and the charge station sub-assembly form the charge station.

4. The assembly of claim 3 wherein:
   the electrical circuit is a 240V electrical circuit and the charge station is a 240V charge station.

5. The assembly of claim 1 wherein:
   the charge station housing is fixedly mounted to an exterior wall of an edifice and the second connector of the charge station sub-assembly is hard-wired to an electrical circuit at a mounted portion of the wall, the charge unit being electrically connected to the electrical circuit while the charge unit and the charge station sub-assembly form the charge station.

6. The assembly of claim 1 wherein:
   the cord set sub-assembly further includes a power plug connectable to an electrical outlet, the charge unit being electrically connected to the electrical outlet while the power plug is connected to the electrical outlet and while the charge unit and the cord set sub-assembly form the cord set.

7. The assembly of claim 6 wherein:
   the electrical outlet is one of a 120V and a 240V electrical outlet and the cord set is one of a 120V and a 240V cord set.

8. The assembly of claim 7 further comprising:
   a second cord set sub-assembly having a fourth connector of the second type, wherein the charge unit electrically connects to the second cord set sub-assembly while the first connector of the charge unit and the fourth connector of the second cord set sub-assembly are connected to one another to thereby form a second cord set;
   the second cord set sub-assembly further including a second power plug connectable to a second electrical outlet, the charge unit being electrically connected to the second electrical outlet while the second power plug is connected to the second electrical outlet and while the charge unit and the second cord set sub-assembly form the second cord set;
   wherein the second electrical outlet is the other one of a 120V and a 240V electrical outlet and the second cord set is the other one of a 120V and a 240V cord set.

9. The assembly of claim 1 wherein:
   the first connector of the first type corresponds with each of the second and third connectors of the second type such that the first connector is enabled to connect to and disconnect from each of the second and third connectors one at a time, the first connector is disabled from connecting to another connector of the first type, and each of the second and third connectors is disabled from connecting to another connector of the second type.

10. The assembly of claim 1 wherein:
    the charge unit further includes a charge cord and a charge handle sequentially connected in series to the control box.

11. An electric vehicle supply equipment assembly comprising:
    a charge unit having a first connector of a first type and a control box connected to the first connector;
    a charge station sub-assembly having a second connector of a second type, the second connector of the charge station sub-assembly being hard-wired to an electrical circuit, the charge station sub-assembly further having a charge station housing having a receiving portion configured to physically receive therein the control box of the charge unit; and
    a first cord set sub-assembly having a third connector of the second type and a first power plug connectable to a first electrical outlet;

wherein the first connector of the charge unit and the second connector of the charge station sub-assembly directly connect to one another upon the control box of the charge unit being physically received within the receiving portion of the charge station housing, the charge unit being electrically connected to the electrical circuit while the first connector of the charge unit and the second connector of the charge station sub-assembly are connected to one another to thereby form a charge station;

wherein the charge unit electrically connects to the first electrical outlet while the first power plug of the cord set sub-assembly is connected to the electrical outlet and the first connector of the charge unit and third connector of the cord set sub-assembly are connected to one another to thereby form a first cord set.

12. The assembly of claim 11 wherein:
the first electrical outlet is one of a 120V and a 240V electrical outlet and the first cord set is one of a 120V and a 240V cord set.

13. The assembly of claim 12 wherein:
the electrical circuit is a 240V electrical circuit and the charge station is a 240V charge station.

14. The assembly of claim 11 further comprising:
a second cord set sub-assembly having a fourth connector of the second type and a second power plug connectable to a second electrical outlet;
wherein the charge unit electrically connects to the second electrical outlet while the second power plug of the second cord set sub-assembly is connected to the second electrical outlet and the first connector of the charge unit and the fourth connector of the second cord set sub-assembly are connected to one another to thereby form a second cord set.

15. The assembly of claim 14 wherein:
the first electrical outlet is one of a 120V and a 240V electrical outlet and the first cord set is one of a 120V and a 240V cord set;
the second electrical outlet is the other one of a 120V and a 240V electrical outlet and the second cord set is the other one of a 120V and a 240V cord set; and
the electrical circuit is a 240V electrical circuit and the charge station is a 240V charge station.

16. The assembly of claim 11 wherein:
the first connector of the first type corresponds with each of the second and third connectors of the second type such that the first connector is enabled to connect to and disconnect from each of the second and third connectors one at a time, the first connector is disabled from connecting to another connector of the first type, and each the second and third connectors is disabled from connecting to another connector of the second type.

17. The assembly of claim 11 wherein:
the charge unit further includes a charge cord and a charge handle sequentially connected in series to the control box.

18. The assembly of claim 11 wherein:
the charge station sub-assembly is configured to automatically disconnect the second connector of the charge station sub-assembly from the electrical circuit while the first connector of the charge unit is disconnected from the second connector of the charge station sub-assembly.

* * * * *